(12) United States Patent
Sylwan et al.

(10) Patent No.: US 11,488,428 B2
(45) Date of Patent: *Nov. 1, 2022

(54) ENABLING DISTRIBUTION OF A MOBILE KEY

(71) Applicant: ASSA ABLOY AB, Stockholm (SE)

(72) Inventors: Peder Sylwan, Stockholm (SE); Eric Thomsen, Bromma (SE); Victor Adolfsson, Arsta (SE); Igor Stevstedt, Enskede (SE); Orjan Bredberg, Enebyberg (SE); Kasper Blom, Alvsjo (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,940

(22) Filed: Dec. 8, 2020

(65) Prior Publication Data

US 2021/0090366 A1 Mar. 25, 2021

Related U.S. Application Data

(63) Continuation of application No. 16/298,302, filed on Mar. 11, 2019, now Pat. No. 10,891,810.

(30) Foreign Application Priority Data

Mar. 12, 2018 (EP) .................................... 18161254

(51) Int. Cl.
*G07C 9/00* (2020.01)
*G06Q 10/10* (2012.01)
(Continued)

(52) U.S. Cl.
CPC ......... *G07C 9/00309* (2013.01); *G06Q 10/00* (2013.01); *G06Q 10/02* (2013.01);
(Continued)

(58) Field of Classification Search
CPC ............ G07C 9/00309; G07C 9/00571; G07C 9/00904; G06Q 10/02; G06Q 10/1095
See application file for complete search history.

(56) References Cited

U.S. PATENT DOCUMENTS 10,891,810 B2 * 1/2021 Sylwan .................. G06Q 10/00
2013/0024222 A1 1/2013 Dunn
(Continued)

FOREIGN PATENT DOCUMENTS

EP 2620919 7/2013
WO WO 2016/011494 1/2016

OTHER PUBLICATIONS

Extended Search Report for European Patent Application No. 18161254.0, dated Jul. 24, 2018, 8 pages.
(Continued)

*Primary Examiner* — Vernal U Brown
(74) *Attorney, Agent, or Firm* — Sheridan Ross P.C.

(57) ABSTRACT

It is provided a method for enabling distribution of a mobile key for obtaining access to a physical space. The method is performed in a mobile key agent and comprises the steps of: receiving a booking signal from a booking agent, the booking signal being associated with a booking of physical space, wherein the booking signal comprises a property identifier, an allocation time, and a name of the user; obtaining a system booking reference associated with the booking of physical space; providing the system booking reference to the booking agent; establishing contact with the mobile key repository, yielding an identifier of the mobile key repository; receiving a space allocation message comprising an identifier of a physical space and the system booking reference; and transmitting a key allocation command to an electronic access control system associated with the property, the key allocation command comprising the identifier
(Continued)

of the mobile key repository, the identifier of the physical space and the allocation time.

17 Claims, 4 Drawing Sheets

(51) Int. Cl.
    *G06Q 10/00*     (2012.01)
    *G06Q 50/12*     (2012.01)
    *G06Q 10/02*     (2012.01)
    *G07C 9/20*     (2020.01)
    *G07C 9/27*     (2020.01)

(52) U.S. Cl.
    CPC ......... *G06Q 10/1095* (2013.01); *G06Q 50/12* (2013.01); *G07C 9/00571* (2013.01); *G07C 9/00857* (2013.01); *G07C 9/00904* (2013.01); *G07C 9/20* (2020.01); *G07C 9/27* (2020.01); *G07C 2009/0088* (2013.01); *G07C 2009/00865* (2013.01)

(56) References Cited

U.S. PATENT DOCUMENTS

| | | |
|---|---|---|
| 2013/0257590 A1 | 10/2013 | Kuenzi et al. |
| 2019/0279449 A1 | 9/2019 | Sylwan et al. |

OTHER PUBLICATIONS

Official Action for U.S. Appl. No. 16/298,302, dated Dec. 26, 2019 9 pages.
Official Action for U.S. Appl. No. 16/298,302, dated Jun. 2, 2020 9 pages.
Notice of Allowance for U.S. Appl. No. 16/298,302, dated Sep. 18, 2020 5 pages.

* cited by examiner

ENABLING DISTRIBUTION OF A MOBILE KEY

CROSS REFERENCE TO RELATED APPLICATIONS

The present application is a continuation of U.S. patent application Ser. No. 16/298,302, filed Mar. 11, 2019, which claims the benefit of European Patent Application No. 18161254.0 filed Mar. 12, 2018, the disclosure of each of which are incorporated herein by reference.

TECHNICAL FIELD

The invention relates to a method, a mobile key agent, a computer program and a computer program product for enabling distribution of a mobile key for obtaining access to a physical space.

BACKGROUND

Locks and keys are evolving from the traditional pure mechanical locks. These days, electronic locks are becoming increasingly common. For electronic locks, electronic keys are used for authentication of a user. For situations where keys need to distributed, e.g. for temporary bookings such as for hotels, cruise ships, etc., a device already owned by the user can be used to hold an appropriate electronic key, denoted a mobile key. For instance, smart phones can have an app which is capable of holding mobile keys.

An issue arises when a booking agent has the commercial interface with the customer. This is valuable for the booking agent and the booking agent does not want to share contact details of the user with the property owner, since the property owner might in this case bypass the booking agent and its fees to instead offer a discounted price to the user.

However, the contact details are used to distribute mobile keys to the user. Hence, it would be greatly beneficial if there were to be a way for the user to receive a mobile key without the booking agent revealing the contact details to the property owner.

SUMMARY

It is an object to provide a way for a user to receive a mobile key without the booking agent revealing the contact details to the property owner.

According to a first aspect, it is provided a method for enabling distribution of a mobile key for obtaining access to a physical space. The method is performed in a mobile key agent and comprises the steps of: receiving a booking signal from a booking agent, the booking signal being associated with a booking of physical space, wherein the booking signal comprises a property identifier, an allocation time, and a name of the user; obtaining a system booking reference associated with the booking of physical space; providing the system booking reference to the booking agent; establishing contact with the mobile key repository, yielding an identifier of the mobile key repository; receiving a space allocation message comprising an identifier of a physical space and the system booking reference; and transmitting a key allocation command to an electronic access control system associated with the property, the key allocation command comprising the identifier of the mobile key repository, the identifier of the physical space and the allocation time.

The step of obtaining a system booking reference may comprise generating the system booking reference.

The method may further comprise the step, prior to the step of establishing contact, of: receiving a mobile key request to connect with a mobile key repository associated with the booking of physical space.

The booking signal may further comprise a user identifier; in which case the step of establishing contact comprises finding the mobile key repository based on the user identifier.

The step of establishing contact may comprise finding the mobile key repository based on the booking agent.

The step of establishing contact may comprise receiving a connection request from a mobile key repository, wherein the connection request comprising the system booking reference.

According to a second aspect, it is provided a mobile key agent for enabling distribution of a mobile key for obtaining access to a physical space. The mobile key agent comprises: a processor; and a memory storing instructions that, when executed by the processor, cause the mobile key agent to: receive a booking signal from a booking agent, the booking signal being associated with a booking of physical space, wherein the booking signal comprises a property identifier, an allocation time, and a name of the user; obtain a system booking reference associated with the booking of physical space; provide the system booking reference to the booking agent; establish contact with the mobile key repository, yielding an identifier of the mobile key repository; receive a space allocation message comprising an identifier of a physical space and the system booking reference; and transmit a key allocation command to an electronic access control system associated with the property, the key allocation command comprising the identifier of the mobile key repository, the identifier of the physical space and the allocation time.

The instructions to obtain a system booking reference may comprise instructions that, when executed by the processor, cause the mobile key agent to generate the system booking reference.

The mobile key agent may further comprising instructions that, when executed by the processor, cause the mobile key agent to: receive a request to connect with a mobile key repository associated with the booking of physical space.

The booking signal may further comprises a user identifier; in which case the instructions to establish contact comprise instructions that, when executed by the processor, cause the mobile key agent to find the mobile key repository based on the user identifier.

The instructions to establish contact may comprise instructions that, when executed by the processor, cause the mobile key agent to receive a connection request from a mobile key repository, the connection request comprising the system booking reference.

According to a third aspect, it is provided a computer program for enabling distribution of a mobile key for obtaining access to a physical space. The computer program comprises computer program code which, when run on a mobile key agent causes the mobile key agent to: receive a booking signal from a booking agent, the booking signal being associated with a booking of physical space, wherein the booking signal comprises a property identifier, an allocation time, and a name of the user; obtain a system booking reference associated with the booking of physical space; provide the system booking reference to the booking agent; establish contact with the mobile key repository, yielding an identifier of the mobile key repository; receive a space allocation message comprising an identifier of a physical space and the system booking reference; and transmit a key allocation command to an electronic access control system associated with the property, the key allocation command comprising the identifier of the mobile key repository, the identifier of the physical space and the allocation time.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
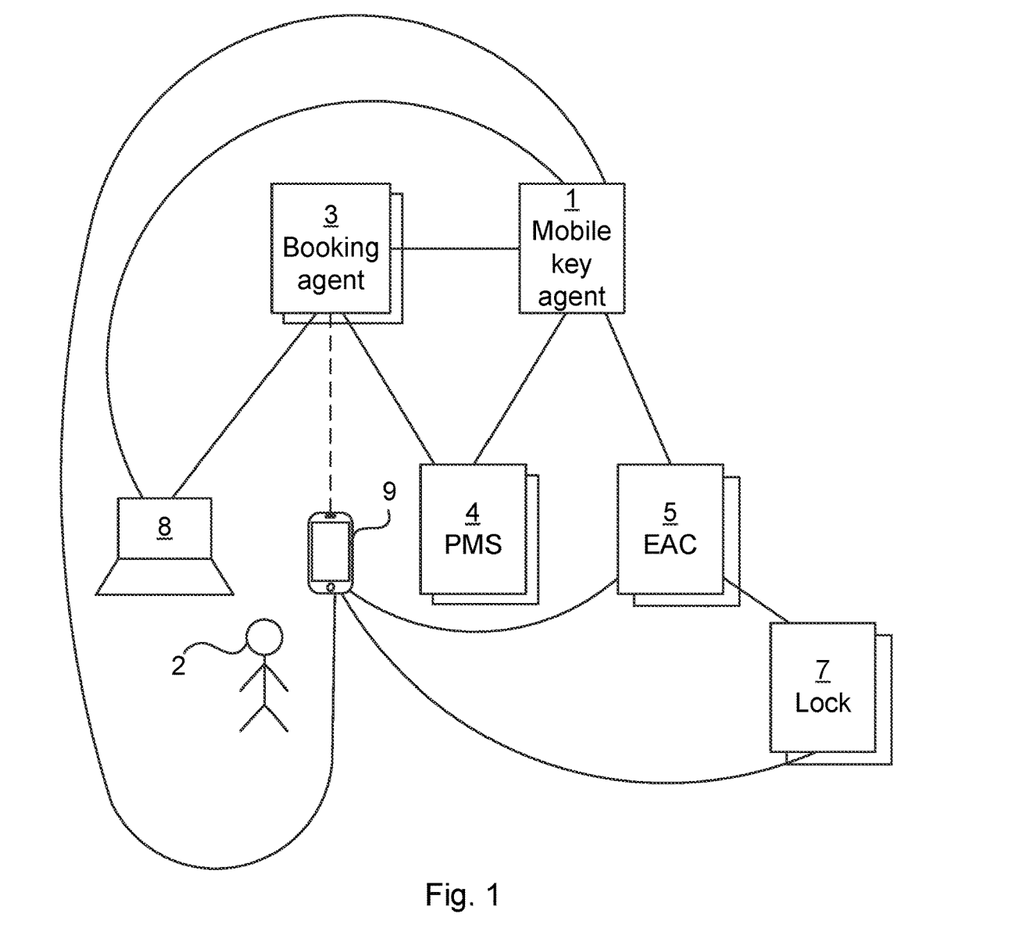
FIG. 1 is a schematic diagram illustrating an environment in which embodiments presented herein can be applied.

FIG. 1 is a schematic diagram illustrating an environment in which embodiments presented herein can be applied. The environment is used to book and obtain access to a physical space. The environment can relate to any situation where bookings for physical spaces are performed, e.g. for hotels, cruise ships, student lodging, office hotels, etc.

A user 2 interacts with a user device 8 and a mobile key repository 9. The user device can e.g. be a laptop computer, a desktop computer, a tablet computer, smartphone, etc., which is capable of communicating with a booking agent 3. The mobile key repository 9 is here in the form of a smartphone, or more specifically in a key holding app on the smartphone. While the term smartphone is used to denote the mobile key repository 9 hereinafter, the mobile key repository 9 can be implemented using any suitable portable device, e.g. tablet computer, wearable device (e.g. smartwatch), dedicated mobile key device, etc. Optionally, the user device 8 and the mobile key repository is implemented using a single device, e.g. a smartphone.

A booking agent 3 is used to coordinate bookings of physical spaces of a property. When applied for hotels, the booking agent 3 can be a hotel room broker, such a hotel booking website, or travel agent.

A property management system (PMS) 4 is used to manage bookings of the property. For the purposes described herein, the PMS 4 keeps track of available capacity of the property and accepts or denies a booking request from the booking agent 3. It is to be noted that whenever the term PMS is used herein, this refers to any system that is capable of performing the actions and responsibilities described. For instance, the PMS can be combined physically with the electronic access control system (EAC) mentioned below. Each property, and each PMS, can be associated with one or multiple booking agents 3.

Figure 2:
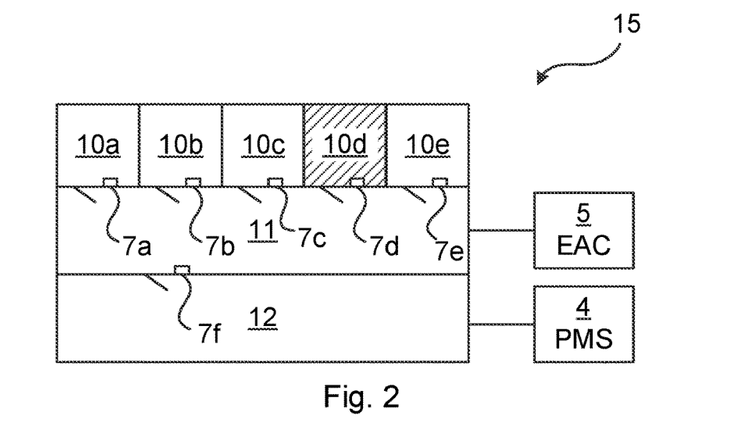
FIG. 2 is a schematic diagram illustrating physical spaces of a property and schematic connection to the EAC and PMS of FIG. 2.

The property comprises a plurality of locks 7, each controlling access to a physical space, as shown in FIG. 2 and explained in more detail below.

The electronic access control system (EAC) 5 is a system which can issue keys for gaining access to one or more of the locks. Specifically, the EAC 5 can issue electronic mobile keys which can be securely distributed to the smartphone 9 as known in the art per se.

A mobile key agent 1 is implemented as a server for enabling distribution of mobile keys to the user 2 without revealing contact information to the user for the PMS 4.

FIG. 2 is a schematic diagram illustrating physical spaces 10*a-e*, 11, 12 of a property 15 and schematic connection to the EAC and PMS of FIG. 2.

In this example, the property 15 can e.g. be a hotel, a cruise ship, student lodging or office hotel. In this example, the property 15 contains one type of physical space in terms of five individual rooms 10*a-e*. Moreover, there is a common secure space 11 and a common open space 12.

Each one of the rooms 10*a-e* is secured by a respective lock 7*a-e*. The common secure space 11 is secured by a sixth lock 7*f*.

The property is managed by a PMS 4 and keys to the locks 7*a-f* are issued by an EAC 5. The EAC 5 keeps track of all of the locks 7*a-f*. In this example, a fourth individual room 10*d* is assigned to a booking. The EAC 5 is configured such that if an electronic key is to be issued for the fourth lock 7*d* to provide access to the fourth individual room 10*d*, the EAC also needs to include an electronic key for the fifth lock 7*f* to provide access to the common secure space 11.

Figure 3A:
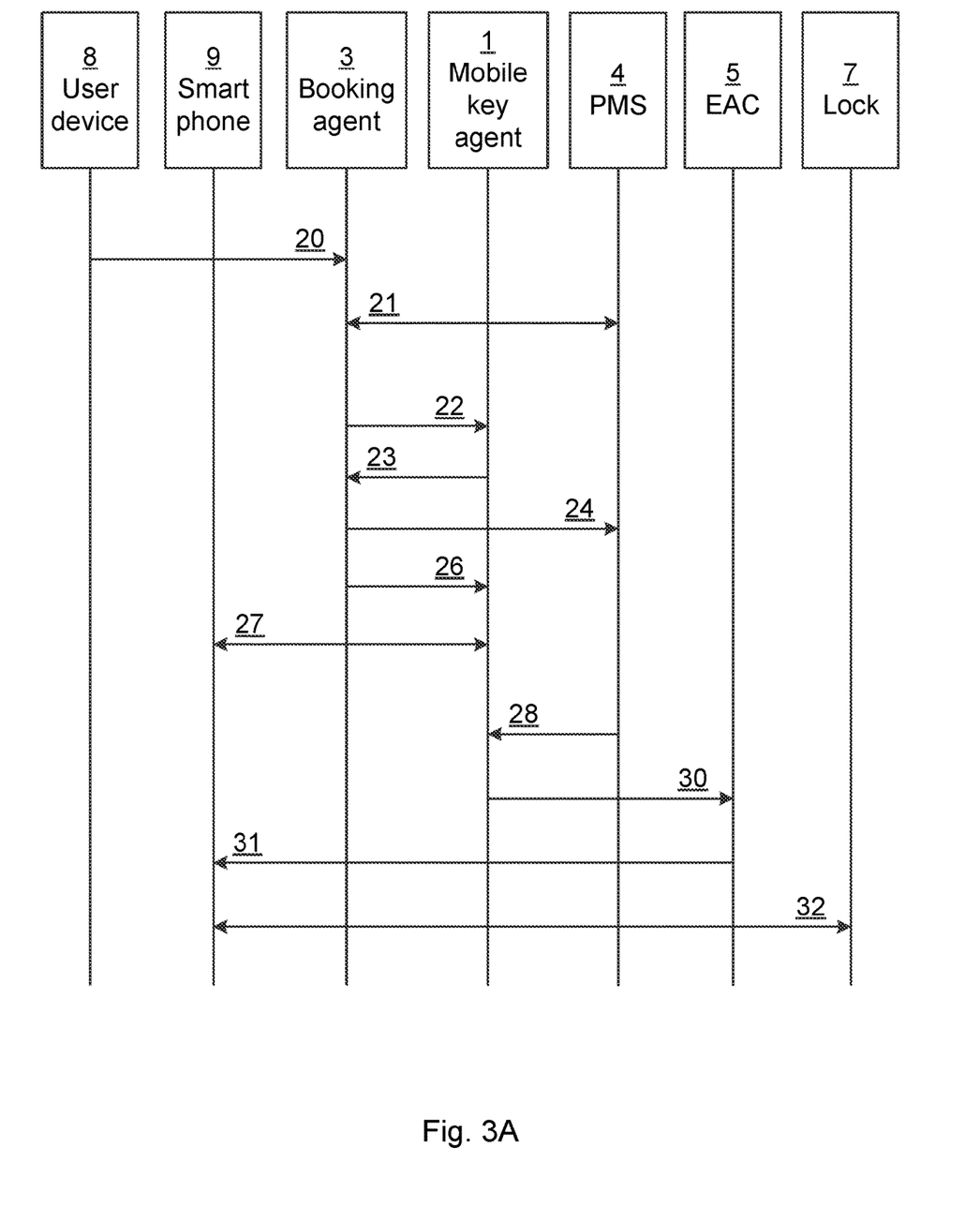
FIGS. 3A-B are sequence diagram illustrating communication between various entities of embodiments which can be applied in the environment of FIG. 1.
Figure 3B:
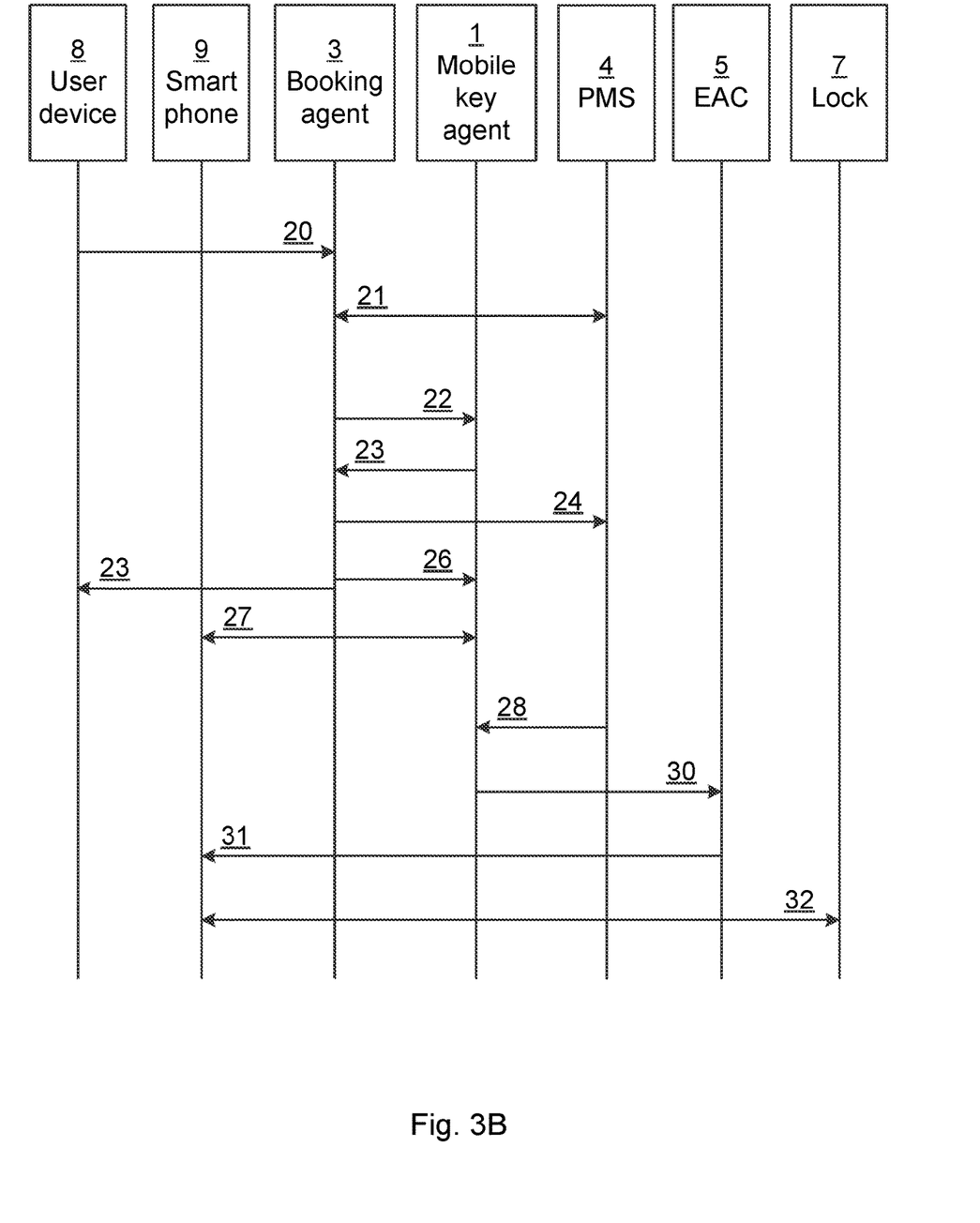

FIGS. 3A-B are sequence diagram illustrating communication between various entities of embodiments which can be applied in the environment of FIG. 1. All communication between entities here are based on established communication protocols, e.g. IP (Internet Protocol) over a layer which wire-based (such as Ethernet) and/or wireless (such as any of the IEEE 802.11x standards), LTE (Long Term Evolution), W-CDMA (Wideband Code Division Multiple Access), BLE (Bluetooth Low Energy), Bluetooth, and/or RFID (Radio Frequency Identification) etc.).

First, the user device 8 sends a booking request 20 to the booking agent 3, e.g. using a web page interface or using an app on the user device 8. The booking agent 3 interacts 21 with the PMS 4 to confirm availability for the booking. If availability is not confirmed, the sequence restarts. On the other hand, if availability is confirmed, the sequence proceeds.

Once availability is confirmed, the booking agent 3 sends a booking signal 22 to the mobile key agent 1. The booking signal 22 is for this particular booking, and contains a property identifier (e.g. hotel identifier), an allocation time (i.e. when access to the physical space will be needed) and a name of the user. The allocation time can be in the form of a start date and an end date, optionally also including a start time and/or an end time of the allocation. The name of the user is a plain text name, e.g. first name and surname. In this embodiment, the booking signal 22 also contains a user identifier, e.g. in the form of an e-mail address or a phone number.

The mobile key agent 1 obtains (e.g. generates) a system booking reference for the booking and sends the system booking reference 23 to the booking agent 3. The system booking reference is specific for this particular booking and is not reused for any future bookings.

The booking agent 3 informs 24 the PMS of the booking reference, together with the name of the user and the allocation time. Significantly, the booking agent 3 refrains from providing the user identifier to the PMS. The reason for this is if the PMS (e.g. of a hotel) were to gain access to the user identifier, the property owner could directly contact the user for commercial purposes, effectively bypassing the booking agent which has managed to set up the commercial relationship with the user in the first place. The term 'property owner' is a party which owns the property, or a party appointed to have final say on bookings of physical spaces of the property.

It is to be noted that the booking agent 3 informing 24 the PMS of the booking reference interaction 24 can occur before the booking agent 3 interacting 21 with the PMS 4 to confirm availability.

At this stage, the PMS has stored in the system booking reference with the booking and the booking is done, but the smartphone is not yet identified to be the container for the mobile key. It is to be noted that the booking agent and/or the PMS may have separate booking references which are used for different purposes than those presented herein; the system booking reference is introduced herein to enable distribution of mobile keys without revealing the user identifier.

The booking agent 3 then optionally sends a mobile key request 26 to the mobile key agent 1 to connect with the smartphone 9 (or more specifically the key holding app of the smartphone) of the user. Alternatively, the mobile key agent 1 proceeds without the mobile key request 26 from the booking agent 3. There may be multiple key holding apps which can be used on the smartphone of the user. The determination of which key holding app to use can be based on which booking agent 3 was used to make the booking. In this case, there is a mapping available to the mobile key agent 1 between booking agent 3 and key holding app.

Subsequently, the mobile key agent 1 and the key holding app on the smartphone 9 connect 27. When the mobile key agent 1 is provided with the user identifier from the booking agent 3, the mobile key agent can find one or more smartphones 9 (or more specifically, the installed key holding apps) associated with the user identifier. The user will then be prompted by each instance of the key holding app (or a single one, if that is the case) associated with the user identifier, whether to accept that key holding app (on that smartphone 9) as the mobile key repository for that booking. When the user accepts to use the key holding app on that smartphone 9 as the mobile key repository, this is stored by the mobile key agent, along with an identifier of the mobile key repository. When multiple instances of the mobile key repository prompt the user, it is the one which the user first accepts to hold the key which can hold the key. The identifier of the mobile key repository is also known as an end-point identifier.

It is to be noted that the system booking reference can be associated with multiple key holding apps by repeating the connection 27 between the mobile key agent 1 and additional key holding apps. For instance, several people may need a key to the space. Each person can then be added to the booking with the booking agent with corresponding user identifiers, allowing multiple key holding apps to be associated with the system booking reference.

The sequence can now be paused indefinitely until the next message is received, related to space allocation. Typically, the booking can occur a long time before the space allocation, thus leading to the sequence being paused. The next message is a space allocation message 28 which is received as a signal from the PMS 4 or via manual input (e.g. using a web interface of the mobile key agent 1). The space allocation message 28 comprises an identifier of the physical space and the system booking reference.

The mobile key agent 1 can now transmit a key allocation command 30 to the EAC 5 which is associated with the property. The key allocation command 30 comprising the identifier of the mobile key repository 9, the identifier of the physical space 10*d* and the allocation time.

The EAC 5 determines the access rights based on what locks that the mobile key should give access to (e.g. the allocated space, elevator, gym, common secure areas, etc.) and generates a suitable electronic key containing the access rights with a validity time corresponding to the allocation time. The EAC 5 transmits the electronic key 31 to the smartphone 9 which stores the electronic key 31 as a mobile key.

When the user arrives at the property of the booking, the user can use the smartphone to communicate 32 with appropriate locks 7 to gain access to the physical space(s) according to the booking.

Looking now to FIG. 3B, it is illustrated a method where the booking agent 3 does not need to reveal the user identifier with any external entity. In order to make the explanation of this embodiment clear, only differences compared to the sequence of FIG. 3A will be described.

In this embodiment, the booking signal 22 sent from the booking agent 3 to the mobile key agent 1 does not contain any user identifier, other than a name of the user, which is a plain text name and is not certain to be unique.

In order to enable the mobile key agent 1 and the smartphone 9 to connect 27, the booking agent informs 23 the user (e.g. via a web interface or to a booking app of the user) to open the key holder app on the smartphone 9 and to input the system booking reference. The user opens the key holder app and inputs the system booking reference. In one embodiment, the booking agent displays the system booking reference as an alphanumeric code in the user interface for the booking, after which the user inputs the system booking reference manually in the key holder app. In one embodiment, the booking agent shows the system booking reference in the form of a barcode (one-dimensional or two-dimensional, e.g. QR code) in the user interface for the booking of the user device, after which the camera of the smartphone is used by the key holder app to read the barcode, to thereby gain knowledge of the system booking reference.

Once the key holder app of the smartphone 9 knows the system booking reference, it connects 27 to the mobile key agent 1 and provides the system booking reference and the identifier of the mobile key repository to the mobile key agent 1. The mobile key agent 1 stores this association, as this is needed for the mobile key agent 1 to send the key allocation command 30 to the EAC 5 later. Subsequent processing is the same as shown in FIG. 3A and described above.

Using this embodiment, the booking agent 3 does not even need to share the user identifier with the mobile key agent and can keep this key piece of information secret.

Figure 4:
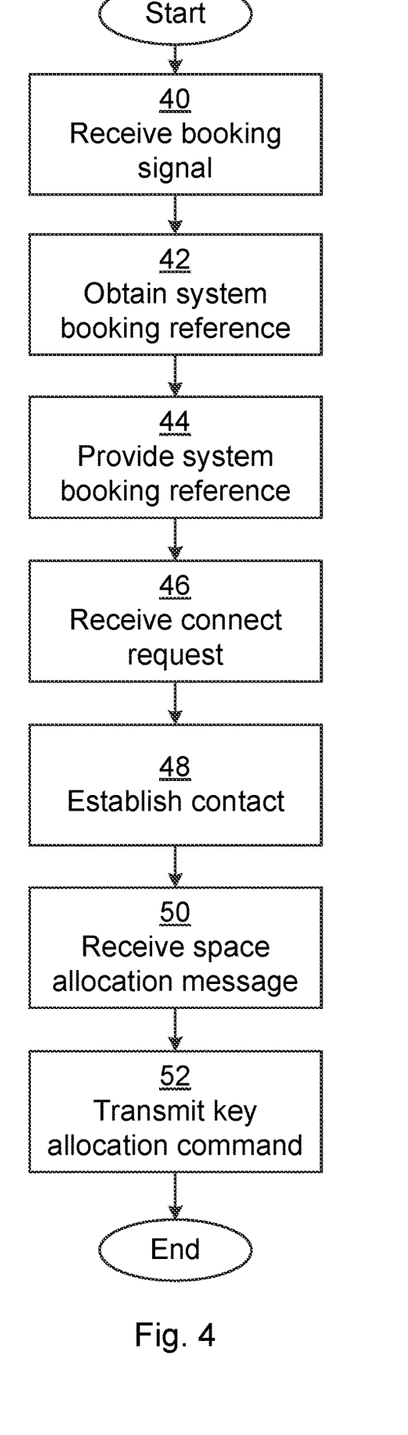
FIG. 4 is a flow chart illustrating embodiments of methods for enabling distribution of a mobile key for obtaining access to a physical space.

FIG. 4 is a flow chart illustrating embodiments of methods for enabling distribution of a mobile key for obtaining access to a physical space. The method can be applied for any situation where booking for physical spaces are performed, e.g. for hotels, cruise ships, student lodging, office hotels, etc. The method is performed in the mobile key agent and corresponds to the actions of the mobile key agent of the sequences illustrated in FIGS. 3A and 3B.

In a receive booking signal step 40, the mobile key agent receives a booking signal from a booking agent. The booking signal is associated with a booking of physical space. The booking signal comprises a property identifier, an allocation time, and a name of the user. Optionally, the booking signal further comprises a user identifier. The user identifier can e.g. be an e-mail address, phone number or social media identifier which uniquely identifies the user. The user identifier is not a name of the user (e.g. first name and surname), since there can be multiple users with the same name. Each user can have multiple user identifiers.

In an obtain system booking reference step 42, the mobile key agent obtains a system booking reference associated with the booking of physical space. In one embodiment, the mobile key agent generates the system booking reference. The system booking reference is unique for each booking signal.

In a provide system booking reference step 44, the mobile key agent provides the system booking reference to the booking agent.

In an optional receive connect request step 46, the mobile key agent receives a connection request to connect with a mobile key repository associated with the booking of physical space.

In an establish contact step 48, the mobile key agent establishes contact with the mobile key repository, yielding an identifier of the mobile key repository.

In one embodiment, when the booking signal comprises a user identifier, the mobile key repository is found based on the user identifier, e.g. based on a database table with user identifiers and mobile key repositories accessible to the mobile key agent.

In one embodiment, the mobile key repository is selected based on the booking agent. For instance, the booking agent may have its own key holding app, or one that the booking agent prefers, to use as the mobile key repository.

In one embodiment, contact is established by receiving a connection request from a mobile key repository, wherein the connection request comprises the system booking reference. The connection also provides the mobile key agent with knowledge of the identifier of the mobile key repository. An association between the system booking reference and the mobile key repository is stored by the mobile key agent.

In a receive space allocation message step 50, the mobile key agent receives a space allocation message comprising an identifier of a physical space and the system booking reference.

In a transmit key allocation command step 52, the mobile key agent transmits a key allocation command to an electronic access control system associated with the property, the key allocation command comprising the identifier of the mobile key repository, the identifier of the physical space and the allocation time.

Using the presented method, mobile keys can be distributed to mobile key repositories without the booking agent needing to disclose the user identifier of the user. Moreover, a single mobile key agent can be used to enable mobile key distribution to an extensive number of locks and properties, as long as the mobile key agent is integrated with appropriate EACs. Moreover, the booking agent is relieved of any need to implement complicated mobile key distribution integration; the booking agent only needs to implement the communication with the mobile key agent as described above.

Figure 5:
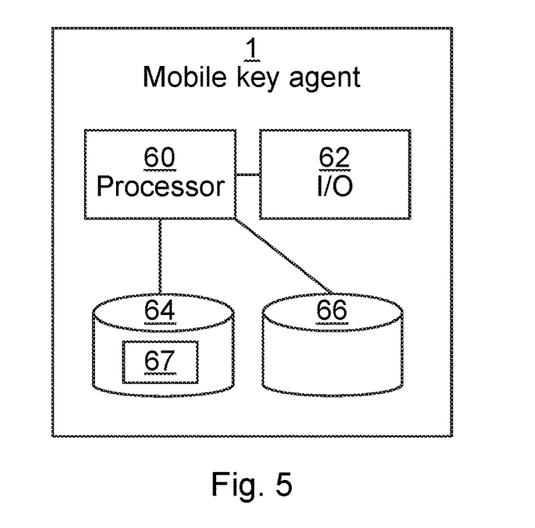
FIG. 5 is a schematic diagram illustrating components of the mobile key agent of FIG. 1 according to one embodiment.

FIG. 5 is a schematic diagram illustrating components of the mobile key agent 1 of FIG. 1 according to one embodiment. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 4 above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The mobile key agent 1 further comprises an I/O interface 62 for communicating with other external entities. Optionally, the I/O interface 62 also includes a user interface.

Other components of the mobile key agent 1 are omitted in order not to obscure the concepts presented herein.

Figure 6:
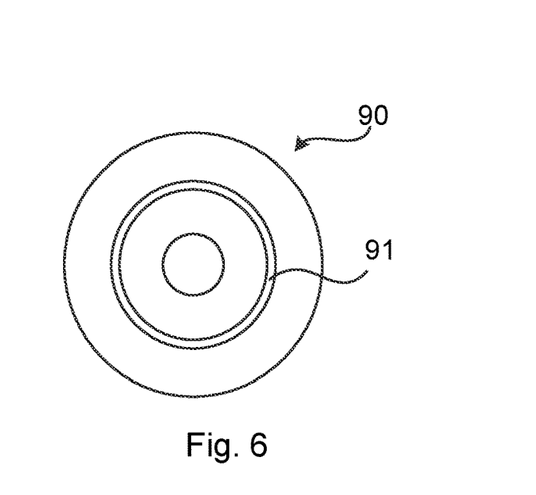
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling distribution of a mobile key for obtaining access to a physical space, the method being performed in a mobile key agent and comprising:

receiving a booking signal from a booking agent, the booking signal being associated with a booking of physical space, wherein the booking signal comprises an allocation time;

obtaining a system booking reference associated with the booking of physical space;

providing the system booking reference to the booking agent;

establishing contact with a mobile key repository, yielding an identifier of the mobile key repository being an end-point identifier to a key holding application on a portable device;

receiving a space allocation message from a different entity than the booking agent, the space allocation message comprising an identifier of the physical space and the system booking reference; and transmitting a key allocation command to an electronic access control system associated with the physical space, the key allocation command comprising the identifier of the mobile key repository, the identifier of the physical space and the allocation time, wherein the key allocation command enables the electronic access control system to determine access rights and generate an electronic key associated with the access rights with a validity based on the allocation time.

2. The method according to claim 1, wherein the obtaining a system booking reference comprises generating the system booking reference.

3. The method according to claim 1, further comprising, prior to the establishing contact, of:

receiving a mobile key request to connect with a mobile key repository associated with the booking of physical space.

4. The method according to claim 1, wherein the booking signal further comprises a user identifier; and the establishing contact comprises finding the mobile key repository based on the user identifier.

5. The method according to claim 1, wherein the establishing contact comprises receiving a connection request from a mobile key repository, the connection request comprising the system booking reference.

6. The method according to claim 1, wherein establishing contact comprises finding the mobile key repository based on the booking agent.

7. The method according to claim 1, wherein the electronic access control system determines access rights based on an identification of a lock to which a mobile key should give access.

8. The method according to claim 1, wherein the space allocation message is received from a property management system.

9. A mobile key agent for enabling distribution of a mobile key for obtaining access to a physical space, the mobile key agent comprising:

a processor; and a memory storing instructions that, when executed by the processor, cause the mobile key agent to:

receive a booking signal from a booking agent, the booking signal being associated with a booking of physical space, wherein the booking signal comprises an allocation time;

obtain a system booking reference associated with the booking of physical space;

provide the system booking reference to the booking agent;

establish contact with the mobile key repository, yielding an identifier of the mobile key repository being an end-point identifier to a key holding application on a portable device;

receive a space allocation message from a different entity than the booking agent, the space allocation message comprising an identifier of a physical space and the system booking reference; and transmit a key allocation command to an electronic access control system associated with the physical space, the key allocation command comprising the identifier of the mobile key repository, the identifier of the physical space and the allocation time, wherein the key allocation command enables the electronic access control system to determine access rights and generate an electronic key associated with the access rights with a validity based on the allocation time.

10. The mobile key agent according to claim 9, wherein the instructions to obtain a system booking reference comprise instructions that, when executed by the processor, cause the mobile key agent to generate the system booking reference.

11. The mobile key agent according to claim 9, further comprising instructions that, when executed by the processor, cause the mobile key agent to:

receive a mobile key request to connect with a mobile key repository associated with the booking of physical space.

12. The mobile key agent according to claim 9, wherein the booking signal further comprises a user identifier; and the instructions to establish contact comprise instructions that, when executed by the processor, cause the mobile key agent to find the mobile key repository based on the user identifier.

13. The mobile key agent according to claim 9, wherein the instructions to establish contact comprise instructions that, when executed by the processor, cause the mobile key agent to receive a connection request from a mobile key repository, the connection request comprising the system booking reference.

14. The mobile key agent according to claim 9, wherein the electronic access control system determines access rights based on an identification of a lock to which a mobile key should give access.

15. A non-transitory computer-readable medium comprising instructions stored thereon that enable distribution of a mobile key for obtaining access to a physical space, the instructions which, when run on a mobile key agent causes the mobile key agent to:

receive a booking signal from a booking agent, the booking signal being associated with a booking of physical space, wherein the booking signal comprises an allocation time;

obtain a system booking reference associated with the booking of physical space;

provide the system booking reference to the booking agent;

establish contact with a mobile key repository, yielding an identifier of the mobile key repository being an end-point identifier to a key holding application on a portable device;

receive a space allocation message comprising an identifier of a physical space and the system booking reference; and transmit a key allocation command to an electronic access control system associated with the physical space, the key allocation command comprising the identifier of the mobile key repository, the identifier of the physical space and the allocation time, wherein the key allocation command enables the electronic access control system to determine access rights and generate an electronic key associated with the access rights with a validity based on the allocation time.

16. A computer program product comprising the non-transitory computer-readable medium according to claim 15.

17. The non-transitory computer-readable medium according to claim 15, wherein the electronic access control system determines access rights based on an identification of a lock to which the mobile key should give access.

\* \* \* \* \*